US012562897B2

(12) United States Patent
Matsutani et al.

(10) Patent No.: US 12,562,897 B2
(45) Date of Patent: Feb. 24, 2026

(54) VEHICLE ADVERTISEMENT SYSTEM

(71) Applicant: TOYOTA JIDOSHA KABUSHIKI KAISHA, Toyota (JP)

(72) Inventors: Shintaro Matsutani, Kariya (JP); Ryuichi Danno, Kasugai (JP); Atsushi Ikegaya, Aisai (JP); Masashi Nomoto, Tokyo (JP); Oral Kaplan, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 18/410,123

(22) Filed: Jan. 11, 2024

(65) Prior Publication Data

US 2024/0396728 A1     Nov. 28, 2024

(30) Foreign Application Priority Data

May 22, 2023     (JP) ................................. 2023-083779

(51) Int. Cl.
*H04L 9/08*          (2006.01)
(52) U.S. Cl.
CPC ..................................... *H04L 9/088* (2013.01)
(58) Field of Classification Search
CPC ......... H04W 4/40; H04W 4/02; H04W 12/06; H04W 4/029; H04W 4/44; H04W 12/03; H04W 12/041; H04W 12/069; H04W 4/48; H04W 12/033; H04W 4/023; H04W 4/80; H04W 4/90; H04L 63/0428; H04L 67/12; H04L 2209/84; H04L 63/166; H04L 9/3231; H04L 2463/082; H04L 63/0823; H04L 9/3247; H04L 63/0861; H04L 9/3226; H04L 9/0662; H04L 9/0838; H04L 63/029; H04L 9/088; G06F 3/14; G06F 21/316; G06F 21/32; G06F 2221/2103; G06F 16/583; G06F 16/9535; G06F 21/43; G06F 21/6263; G06F 2221/2111; G06F 12/0246
USPC ........ 713/171, 150, 163, 181; 726/2, 21, 36; 380/255, 264, 276
See application file for complete search history.

(56) References Cited

U.S. PATENT DOCUMENTS

| | | | |
|---|---|---|---|
| 8,522,028 B2 * | 8/2013 | Brique ..................... | G06F 21/72 |
| | | | 713/168 |
| 11,080,387 B1 * | 8/2021 | Lattin ................... | G06F 21/121 |
| 2010/0191967 A1 * | 7/2010 | Fujii ................... | H04L 63/0861 |
| | | | 713/169 |
| 2011/0231034 A1 * | 9/2011 | Kinser ..................... | B60K 6/46 |
| | | | 701/2 |
| 2013/0193920 A1 * | 8/2013 | Dickerhoof ............. | B60L 53/00 |
| | | | 320/109 |
| 2013/0326045 A1 * | 12/2013 | Wang ................... | H04L 41/0226 |
| | | | 709/223 |

(Continued)

FOREIGN PATENT DOCUMENTS

JP          2014-241098 A     12/2014

*Primary Examiner* — Sharif E Ullah
(74) *Attorney, Agent, or Firm* — SoraIP, Inc.

(57) ABSTRACT

Receiving first data regarding driving from the vehicle, a control unit is configured to execute generating and encrypting second data to be transmitted to the first server based on the first data, and transmitting the encrypted second data to the first server. and transmitting to the first server, every predetermined period, a key for decoding the second data transmitted to the first server during the predetermined period.

4 Claims, 4 Drawing Sheets

(56)        References Cited

U.S. PATENT DOCUMENTS

2015/0350167  A1*  12/2015  Djakovic  ............ H04L 61/5092
                                                                                  713/163
2017/0310674  A1*  10/2017  Markham  ............. H04W 12/04
2019/0007215  A1*   1/2019  Hakuta  ............... H04W 12/069
2021/0119800  A1*   4/2021  Jung  .................... H04L 9/3242
2021/0209494  A1*   7/2021  Mukherjee  ............. H04L 67/12
2021/0211271  A1*   7/2021  Kuang  ................... H04L 9/065
2021/0250174  A1*   8/2021  Cheng  ................. H04L 9/0869
2021/0281408  A1*   9/2021  Liu  ........................ G06F 7/588
2022/0123923  A1*   4/2022  Patne  ................... H04W 12/04

* cited by examiner

221 VEHICLE DATA

| USER ID | VEHICLE ID | FULL NAME | ADDRESS | EMAIL ADDRESS | POSITION |
|---------|-----------|-----------|---------|---------------|----------|
| xxx | xxx | xxx | xxx | xxx | xxx |
| . . . | . . . | . . . | . . . | . . . | . . . |

START

S101 — VEHICLE DATA ACQUISITION

S102 — PROVIDED DATA GENERATION

S103 — PROVIDED DATA ENCRYPTION

S104 — ENCRYPTED DATA TRANSMISSION

S105 — HAS THE SPECIFIED PERIOD PASSED?  NO

YES

S106 — DO YOU CONSENT TO DISCLOSURE?  NO

YES

S107 — SEND DECRYPTION KEY

S108 — NOTIFY NOT TO SEND DECRYPTION KEY

END

VEHICLE ADVERTISEMENT SYSTEM

CROSS-REFERENCE TO RELATED APPLICATION

This application claims priority to Japanese Patent Application No. 2023-083779 filed on May 22, 2023 incorporated herein by reference in its entirety.

BACKGROUND

1. Technical Field

The present disclosure relates to an information processing device and an information processing method.

2. Description of Related Art

There is a known technology that anonymizes and manages sensor data of vehicles and so forth, and provides the sensor data to third parties, taking into consideration a balance between usefulness of analysis data and protection of user privacy (e.g., Japanese Unexamined Patent Application Publication No. 2014-241098 (JP 2014-241098 A)).

SUMMARY

An object of the present disclosure is to enable restriction of usage of data after this data is provided to a third party.

An aspect of the present disclosure is an information processing device, including a control unit configured to execute receiving first data regarding traveling, from a vehicle, generating second data to be transmitted to a first server, based on the first data, and encrypting the second data, transmitting the second data that is encrypted to the first server, and transmitting, to the first server, at every predetermined period, a key for decrypting the second data transmitted to the first server during the predetermined period.

Another aspect of the present disclosure is an information processing method in which a computer executes receiving first data regarding traveling, from a vehicle, generating second data to be transmitted to a first server, based on the first data, and encrypting the second data, transmitting the second data that is encrypted to the first server, and transmitting, to the first server, at every predetermined period, a key for decrypting the second data transmitted to the first server during the predetermined period.

Another aspect of the present disclosure is a program for causing a computer to execute the above information processing method, or a storage medium that non-transitorily stores this program.

According to the present disclosure, usage of data after this data is provided to a third party can be restricted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
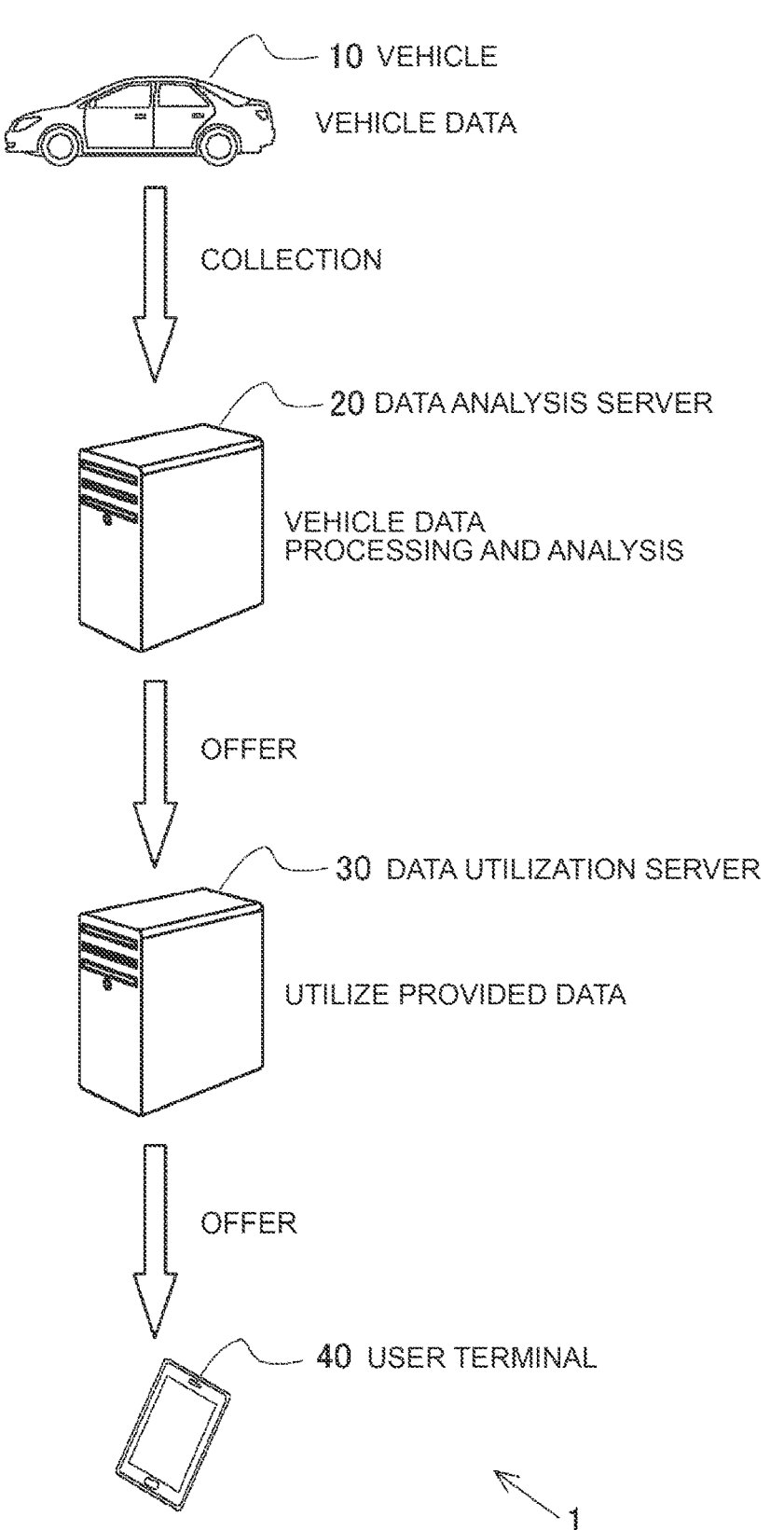
FIG. 1 is a diagram schematically showing the flow of data in the system according to the first embodiment.

The control unit included in the information processing device, which is one aspect of the present disclosure, receives first data regarding driving from the vehicle, and generates second data to be transmitted to the first server based on the first data. encrypting, transmitting the encrypted second data to the first server, and transmitting to the first server, every predetermined period, a key for decrypting the second data transmitted to the first server during the predetermined period; and is configured to do so.

The first data is information regarding the running of the vehicle, and includes, for example, position information or information regarding sensor detection values. Further, the first data may include information (for example, name, age, address, telephone number, e-mail address, etc.) regarding the user (or driver) of the vehicle 10. Further, the first data may include information regarding the activation state of the system of the vehicle 10. Furthermore, the first data may include data regarding multiple items. The first data may be transmitted from the vehicle, for example, in real time or at predetermined intervals.

The control unit generates second data based on the first data. The second data may be data obtained by processing the first data so that it can be used by a third party. Further, the second data may be data related to the analysis results of the first data. Furthermore, when the first data includes a plurality of items, the data may be divided into each item to generate a plurality of second data. The generated second data is then encrypted. When a plurality of second data is generated by dividing into respective items, each second data may be encrypted using a different encryption key.

The encrypted second data is sent to the first server, but the second data cannot be used unless it is decrypted by the first server. The control unit transmits a key for decrypting the second data to the first server at predetermined intervals. By decrypting the second data using this key, the second data becomes available at the first server. In this way, the encrypted second data is sent to the first server in advance, and the decryption key is sent later. For example, it is conceivable that the user of the vehicle has consented to the disclosure of the first data, but later no longer consents to the disclosure of the first data. Conventionally, once data has been sent to the first server, it has been difficult to restrict the use of that data. On the other hand, since the control unit transmits the decryption key after transmitting the second data, by not transmitting the decryption key after transmitting the second data and before transmitting the decryption key, Disclosure of the second data in the first server can be suppressed.

Hereinafter, embodiments of the present disclosure will be described with reference to the drawings. The configurations of the following embodiments are illustrative, and the present disclosure is not limited to the configurations of the embodiments. Further, the following embodiments can be combined as much as possible.

First Embodiment

FIG. 1 is a diagram schematically showing the flow of data in a system 1 according to the first embodiment. In the example of FIG. 1, the system 1 includes a vehicle 10, a data analysis server 20, a data utilization server 30, and a user terminal 40. In the vehicle 10, data is acquired by a sensor that detects the state of the vehicle 10, a sensor that detects position information, and the like. The vehicle 10 also stores data regarding the user. These data are transmitted from the vehicle 10 to the data analysis server 20. The data analysis server 20 is a server that collects data from the vehicle 10, analyzes or processes the data, and provides analysis results and processed data to the data utilization server 30. Note that the data analysis server 20 can also provide the data acquired from the vehicle 10 to the data utilization server 30 without processing or analyzing the data. The data analysis server 20 encrypts the data provided to the data utilization server 30 and then transmits the encrypted data to the data utilization server 30. Furthermore, the data analysis server 20 transmits, at every predetermined period, a key for decoding the data transmitted to the data utilization server 30 during the predetermined period. Note that the data utilization server 30 is an example of a first server.

The data utilization server 30 stores data provided from the data analysis server 20. Then, data is decrypted using the decryption key received at predetermined intervals, and the data is utilized. For example, the data utilization server 30 generates an advertisement for each driver of the vehicle 10 based on the decoded data, and transmits the advertisement to the user terminal 40 owned by the driver of the vehicle 10. At this time, the advertisement may be sent by e-mail, for example. For example, if the data includes location information, it would be possible to identify the places that drivers often go to based on the data and provide users with advertisements that match those places. Alternatively, the driver's preferences may be estimated based on the places the driver often goes, and advertisements that match the estimated preferences of the driver may be provided. Note that the user terminal 40 may be a terminal mounted on the vehicle 10. In this case, advertisement data to be displayed on the display of the vehicle 10 may be transmitted to the user terminal 40.

The vehicle 10, the data analysis server 20, the data utilization server 30, and the user terminal 40 are interconnected by a network N1. The network N1 is, for example, a world-wide public communication network such as the Internet, and a wide area network (WAN) or other communication networks may be adopted. In addition, the network N1 may include a telephone communication network such as a mobile phone network and a wireless communication network such as Wi-Fi (registered trademark).

Figure 2:
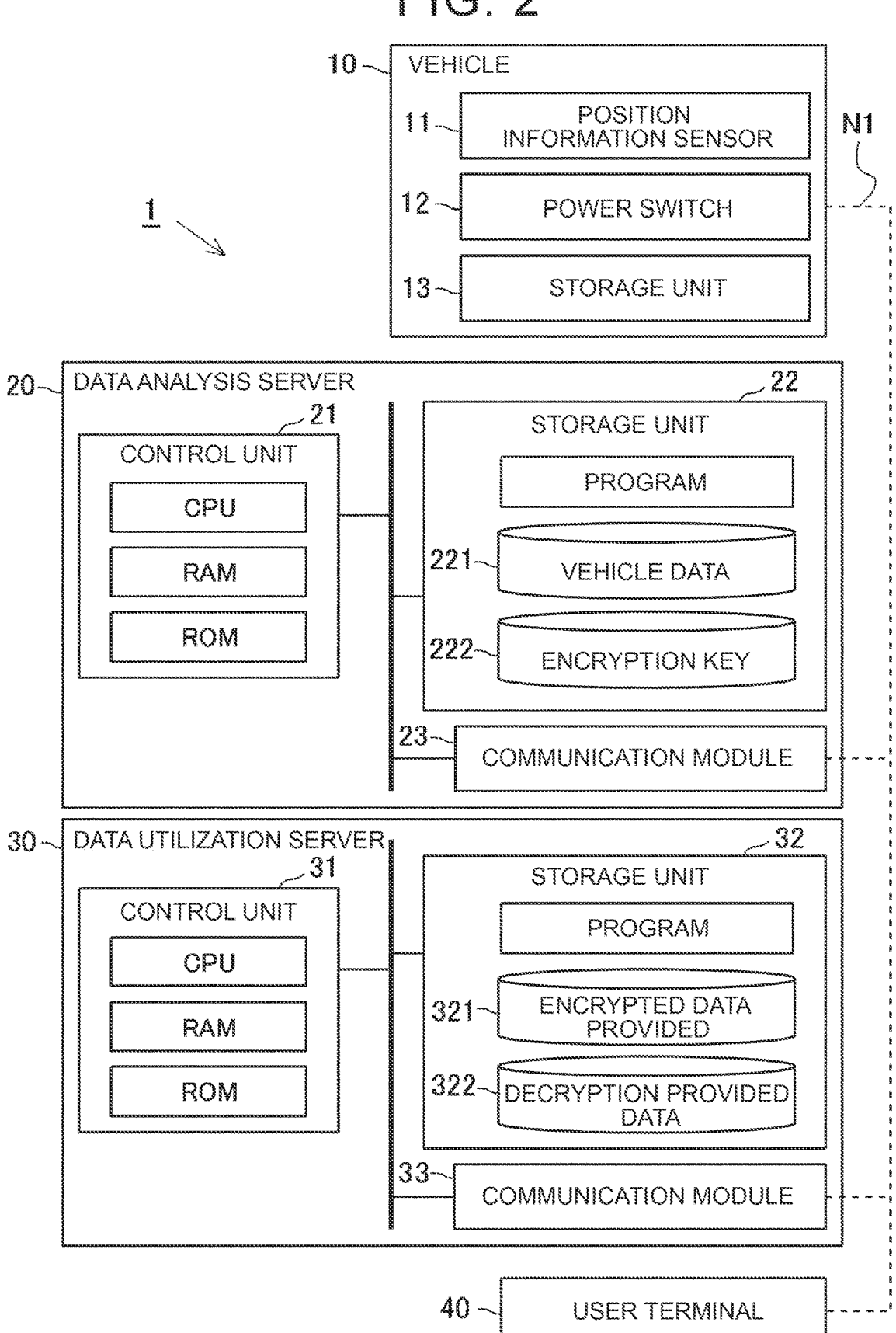
FIG. 2 is a block diagram schematically showing an example of the configuration of a vehicle, a data analysis server, a data utilization server, and a user terminal that constitute the system according to the first embodiment.

FIG. 2 is a block diagram schematically showing an example of the configuration of the vehicle 10, data analysis server 20, data utilization server 30, and user terminal 40 that constitute the system 1 according to the first embodiment. The data analysis server 20 can be configured by a general-purpose computer. That is, the data analysis server 20 can be configured as a computer having a processor such as a CPU or a GPU, a main storage device such as a RAM or ROM, and an auxiliary storage device such as an EPROM, a hard disk drive, or a removable medium. An operating system (OS), various programs, various tables, and the like are stored in the auxiliary storage device. The programs stored in the auxiliary storage device are loaded into the work area of the main storage device and executed, and through this execution, various components are controlled so that various functions can be implemented that match the predetermined purpose, which will be described below. However, some or all of the functions may be implemented by a hardware circuit such as an ASIC or an FPGA.

The data analysis server 20 includes a control unit 21, a storage unit 22, and a communication module 23. The control unit 21 is a calculation device that controls the data analysis server 20. The control unit 21 can be realized by an arithmetic processing device such as a CPU.

The storage unit 22 includes a main storage device and an auxiliary storage device. The main storage device is a memory in which programs executed by the control unit 21 and data used by the control program are expanded. The auxiliary storage device is a device that stores programs executed by the control unit 21 and data used by the control programs.

Figures 3, 4:
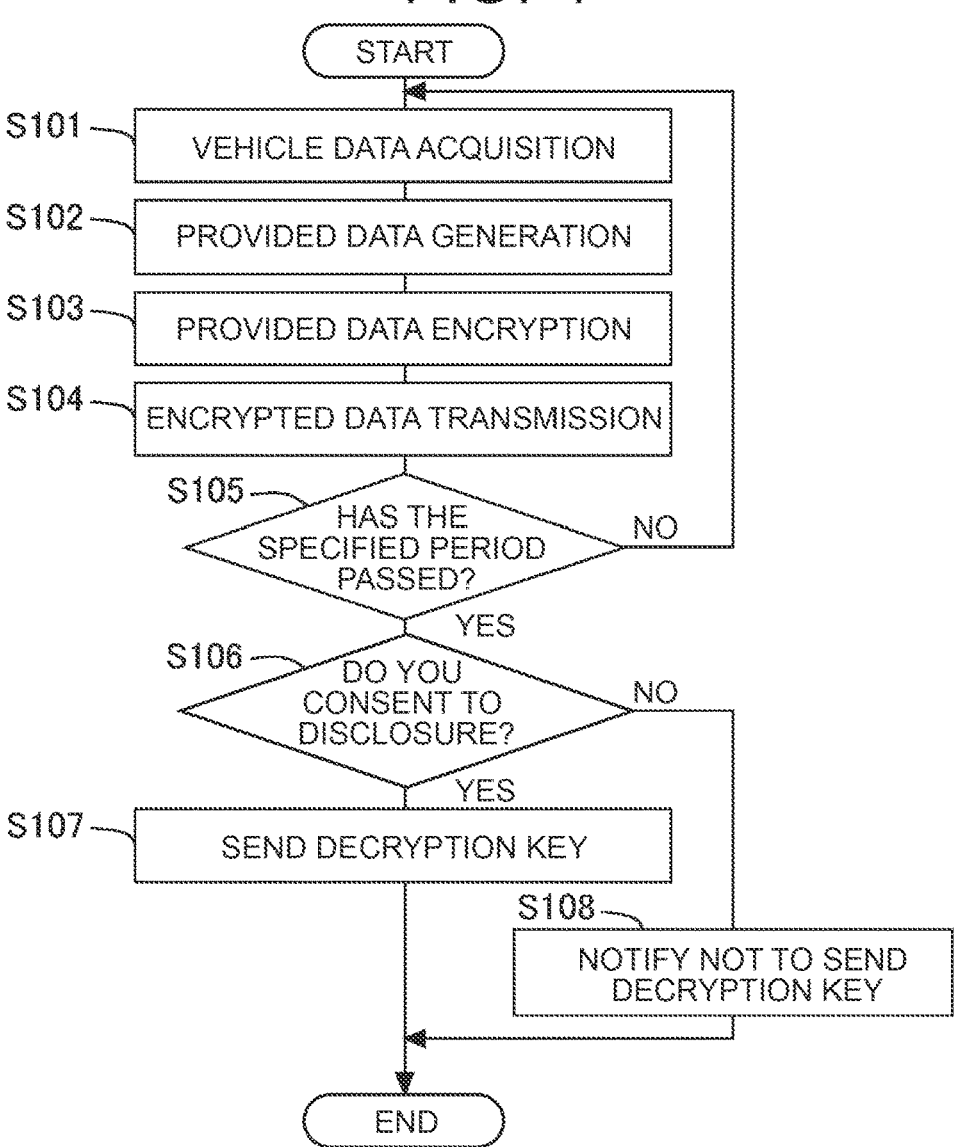
FIG. 3 is a diagram showing an example of vehicle data stored in the storage unit.
FIG. 4 is a flowchart of processing in the data analysis server according to the first embodiment.

Additionally, vehicle data 221 is stored in the storage unit 22. FIG. 3 is a diagram showing an example of vehicle data 221 stored in the storage unit 22. The vehicle data 221 includes information regarding each of the user ID, vehicle ID, name, address, e-mail address, and location of the vehicle 10. The user ID is an identification symbol of the driver of the vehicle 10. Note that the driver of the vehicle 10 may be the owner of the vehicle 10. The vehicle ID is an identification symbol of the vehicle 10. The name is the name of the driver of the vehicle 10. The address is the address of the driver of the vehicle 10. The e-mail address is an e-mail address at which the driver of the vehicle 10 can be contacted. The position of the vehicle 10 is a position detected in the vehicle 10. Vehicle data 221 is transmitted from vehicle 10 at predetermined intervals. Vehicle data 221 is an example of first data.

Furthermore, the storage unit 22 stores an encryption key 222 used when encrypting the provided data. The provided data is data generated based on the vehicle data 221 and is data provided to the data utilization server 30. The provided data may be, for example, data obtained by converting the vehicle data 221 into a format that can be used by the data utilization server 30. Further, as another example, the provided data may be data obtained by extracting items requested from the data utilization server 30 from the vehicle data 221. Furthermore, as another example, the provided data may be data representing a result of a predetermined analysis performed by the control unit 21 on the vehicle data 221. The encryption key 222 is an encryption key corresponding to the provided data transmitted to the data utilization server 30 during a predetermined period, and is changed by the control unit 21 at every predetermined period. The predetermined period is a period during which the vehicle 10 travels a predetermined distance, or a period during which the vehicle 10 makes one trip. Here, a trip is a unit of travel in which a period from when the system of the vehicle 10 is started to when the system is shut down is set as one unit. Note that the provided data is an example of second data.

Further, the communication module 23 is a communication interface for connecting the data analysis server 20 to the network N1. The communication module 23 includes, for example, a network interface board and a wireless communication interface for wireless communication.

The data utilization server 30, like the data analysis server 20, can be configured by a general-purpose computer. That is, the data utilization server 30 can be configured as a computer having a processor such as a CPU or a GPU, a main storage device such as a RAM or ROM, and an auxiliary storage device such as an EPROM, a hard disk drive, or a removable medium.

The data utilization server 30 includes a control unit 31, a storage unit 32, and a communication module 33. The control unit 31 is a calculation device that manages control performed by the data utilization server 30. The control unit 31 can be realized by an arithmetic processing device such as a CPU.

The storage unit 32 includes a main storage device and an auxiliary storage device. The main storage device is a memory in which programs executed by the control unit 31 and data used by the control program are expanded. The auxiliary storage device is a device that stores programs executed by the control unit 31 and data used by the control programs.

Further, the storage unit 32 stores encrypted provided data 321 and decryption provided data 322. The encrypted provided data 321 is encrypted provided data received from the data analysis server 20. The decryption provided data 322 is data obtained by decrypting the encrypted provided data 321 using the decryption key received from the data analysis server 20.

Further, like the communication module 23 of the data analysis server 20, the communication module 33 is a communication interface for connecting the data utilization server 30 to the network N1.

The vehicle 10 includes a position information sensor 11, a power switch 12, and a storage unit 13. The position information sensor 11 acquires position information (for example, latitude and longitude) of the vehicle 10 at a predetermined period. The position information sensor 11 is, for example, a Global Positioning System (GPS) receiving unit, a wireless LAN communication unit, or the like. The position of the vehicle 10 acquired by the position information sensor 11 is transmitted to the data analysis server 20 along with the user ID, vehicle ID, name, address, and e-mail address. In addition, in this embodiment, the position of the vehicle 10 detected by the position information sensor 11 is included in the vehicle data, but this is not limited to the position of the vehicle 10, and the detection value of various sensors attached to the vehicle 10 can be included in the vehicle data.

The power switch 12 is a switch that is pressed by the driver to start the vehicle 10 or stop the functions of the vehicle 10. Note that the state in which the driver presses the power switch 12 to start the vehicle 10 is referred to as a power-on state, and the state in which the user presses the power switch 12 again and the vehicle 10 stops functioning is referred to as a power-off state. Power switch 12 may be an IG switch. The power-on state corresponds to the IG-on state, and the power-off state corresponds to the IG-off state. Information regarding the activation state of the vehicle can be included in the vehicle data.

The storage unit 13, like the storage unit 22 of the data analysis server 20, includes a main storage device and an auxiliary storage device. The storage unit 22 stores vehicle data. The driver's name, address, and e-mail address stored in the storage unit 13 are input by the driver.

The user terminal 40 is a computer used by an individual, such as a personal computer, a smartphone, a mobile phone, a tablet computer, or a personal information terminal. As another example, the user terminal 40 is an in-vehicle device of the vehicle 10. The user terminal 40 is configured to be able to receive e-mail from the data utilization server 30, for example. The user terminal 40 has a liquid crystal display that displays the email when it receives the email. Furthermore, the user terminal 40 generates information indicating whether the user agrees to disclose the vehicle data 221 to a third party in accordance with the user's input, and transmits the generated information to the data analysis server 20.

Next, processing in the data analysis server 20 according to the first embodiment will be explained. FIG. 4 is a flowchart of processing in the data analysis server 20 according to the first embodiment. The process shown in FIG. 4 is executed for each vehicle 10 at a predetermined cycle.

In S101, the control unit 21 acquires vehicle data 221. Since the vehicle data 221 is transmitted from the vehicle 10 at predetermined time intervals, the control unit 21 receives the vehicle data 221 at predetermined time intervals and stores it in the storage unit 22. In S102, the control unit 21 generates provision data based on the vehicle data 221. At this time, the control unit 21 generates provision data by converting the vehicle data 221 into a format that can be used by the data utilization server 30, for example. In S103, the control unit 21 encrypts the provided data using the encryption key 222. The encryption key 222 corresponding to the provided data at this time is stored in the storage unit 22.

In S104, the control unit 21 transmits the encrypted provided data (corresponding to the encrypted provided data 321) to the data utilization server 30. For example, upon acquiring the vehicle data 221 from the vehicle 10, the control unit 21 may transmit the encrypted provided data to the data utilization server 30 in real time. The control unit 31 of the data utilization server 30 that receives the encrypted provided data 321 stores the encrypted provided data 321 in the storage unit 32 each time.

In S105, the control unit 21 determines whether a predetermined period of time has elapsed. At this time, the control unit 21 determines, for example, whether one trip of the vehicle 10 has been completed. One trip corresponds to traveling in the vehicle 10 from when the driver presses the power switch 12 to turn on the power to when the driver presses the power switch 12 again to turn off the power. For example, when the vehicle 10 is powered on, data indicating that the vehicle 10 is powered on is transmitted from the vehicle 10. This data may be included in the vehicle data. Similarly, when the vehicle 10 enters the power-off state, data indicating that the vehicle 10 enters the power-off state is transmitted from the vehicle 10. By receiving these data, the control unit 21 determines that one trip of the vehicle 10 has been completed. Thereby, the control unit 21 determines that the predetermined period has elapsed. Note that, as another example, it may be determined that a predetermined period has elapsed each time the vehicle 10 travels a predetermined distance, or it may be determined that a predetermined period has elapsed each time the vehicle 10 travels for a predetermined time. The predetermined distance and predetermined time mentioned here can be set arbitrarily. Further, the predetermined period can also be set regardless of the running of the vehicle 10. If an affirmative determination is made in S105, the process advances to S106, and if a negative determination is made, the process returns to S101.

In S106, the control unit 21 determines whether the driver has consented to disclosing the vehicle data to a third party. The driver notifies the data analysis server 20 in advance via the user terminal 40 whether he or she agrees to disclose the vehicle data to a third party. This consent can be canceled at any time from the user terminal 40. Therefore, if the control unit 21 has obtained a notification from the user terminal 40 agreeing to disclose vehicle data to a third party, the control unit 21 determines whether the driver has consented to disclosing vehicle data to a third party. It is determined that the On the other hand, if you have received a notification from the user terminal 40 regarding the cancellation of this consent, if you have received a notification from the user terminal 40 that you do not consent to the disclosure of vehicle data to a third party, If the user has not obtained any notification regarding whether to consent to disclosure of vehicle data to a third party, consent to disclose the vehicle data to a third party has not been obtained from the user terminal 40. In such a case, the control unit 21 determines that the driver does not consent to disclosing vehicle data to a third party. If an affirmative determination is made in S106, the process proceeds to S107, and if a negative determination is made, the process proceeds to S108.

In S107, the control unit 21 reads the encryption key corresponding to the encrypted provided data from the storage unit 22, and transmits this encryption key to the data utilization server 30 as a decryption key. In the data utilization server 30 that has received the decryption key, the encrypted provided data 321 stored in the storage unit 32 is decrypted by the control unit 31, and decryption provided data 322 is generated. The decryption provided data 322 is stored in the storage unit 32, and the control unit 31 generates an advertisement according to the decryption provided data 322. The generated advertisement is then transmitted from the data utilization server 30 to the user terminal 40. On the other hand, in S108, the control unit 21 notifies the data utilization server 30 that the decryption key will not be transmitted. Since the control unit 21 does not transmit the decryption key for the previously transmitted encrypted provided data, the data utilization server 30 cannot decrypt the encrypted provided data 321 and cannot refer to the provided data.

As explained above, according to the present embodiment, after the data analysis server 20 encrypts and transmits the provided data to the data utilization server 30, the decryption key is not transmitted until a predetermined period has elapsed. If the driver who had agreed to the disclosure of the vehicle data later no longer desires the disclosure, it is possible to prevent the provided data from being used by the data utilization server 30.

Second Embodiment

In the second embodiment, provided data is divided into a plurality of items, and each item is encrypted using a different encryption key. The driver can decide whether to consent to disclosure of information to a third party for each item.

Figure 5:
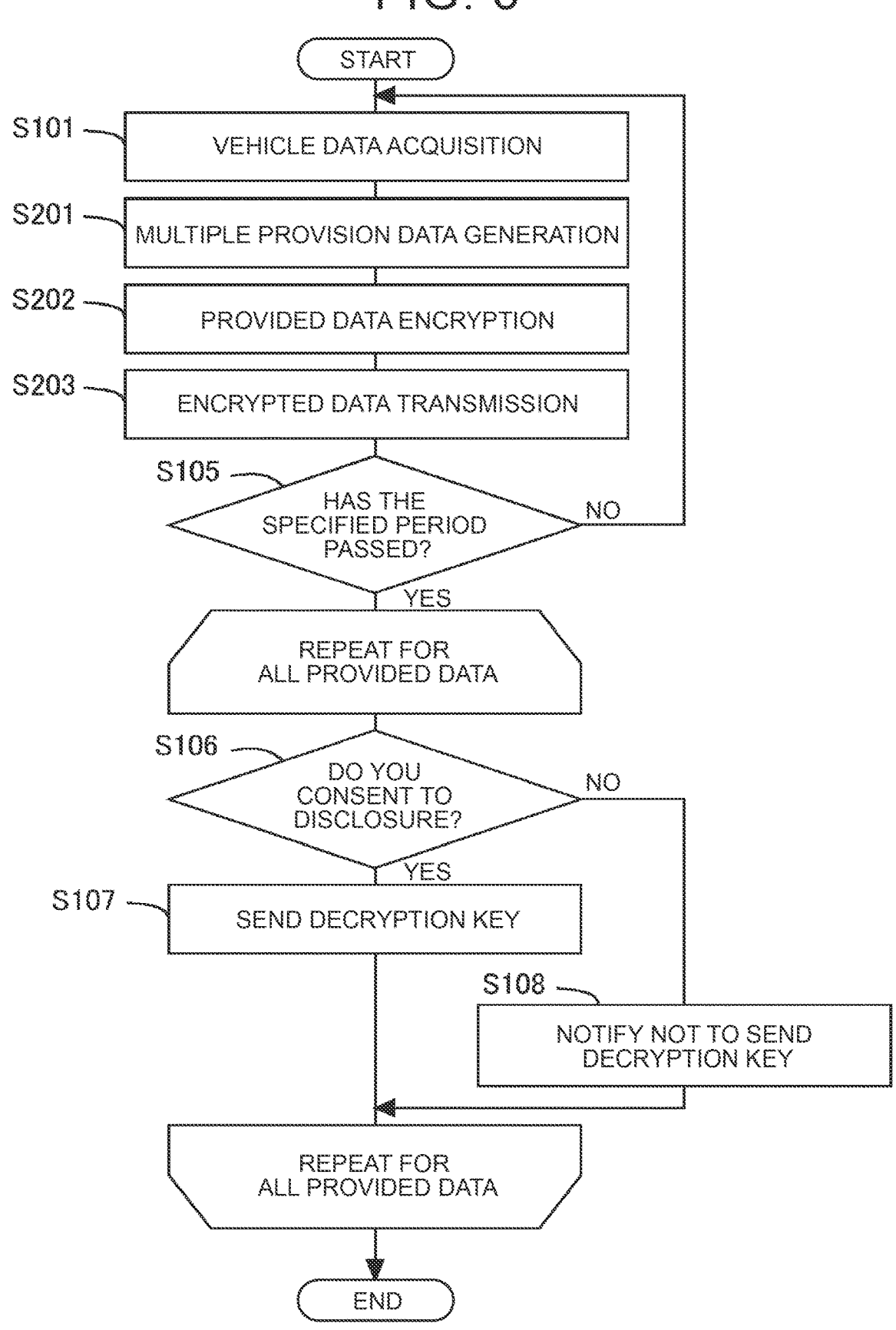
FIG. 5 is a flowchart of processing in the data analysis server according to the second embodiment.

FIG. 5 is a flowchart of processing in the data analysis server 20 according to the second embodiment. The process shown in FIG. 5 is executed for each vehicle 10 at a predetermined cycle. In FIG. 5, steps in which the same processing as that shown in FIG. 4 is executed are represented by the same reference numerals, and the description thereof will be omitted.

In the routine shown in FIG. 5, when the process in S101 is completed, the process advances to S201. In S201, the control unit 21 generates a plurality of pieces of provision data based on the vehicle data 221. The control unit 21 divides the vehicle data 221 stored in the storage unit 22, for example, for each item of the vehicle data 221, and generates provided data corresponding to each item. Note that how the provided data is divided can be set arbitrarily. In S202, the control unit 21 encrypts the generated plurality of provided data using different encryption keys 222, respectively. At this time, the encryption key 222 corresponding to each provided data is stored in the storage unit 22.

In S203, the control unit 21 transmits a plurality of encrypted provided data (corresponding to a plurality of encrypted provided data 321) to the data utilization server 30. For example, upon acquiring the vehicle data 221 from the vehicle 10, the control unit 21 may transmit a plurality of encrypted pieces of provided data to the data utilization server 30 in real time. The control unit 31 of the data utilization server 30 that receives the plurality of encrypted provided data 321 stores the plurality of encrypted provided data 321 in the storage unit 32 each time.

Further, in the routine shown in FIG. 5, when an affirmative determination is made in S105, the processes from S106 to S108 are repeatedly executed for all provided data. On the other hand, if a negative determination is made in S105, the process returns to S101.

The process of S106 is executed for each of the plurality of provided data. Therefore, if the driver does not agree to disclose one of the provided data to a third party, the process of S108 is executed for this one provided data, and the process of S107 is executed for the remaining provided data. Note that in the routine shown in FIG. 5, the process of S107 or S108 is executed for each provided data, but as another example, transmission of a decryption key corresponding to each provided data and notification of not sending a decryption key may be performed all at once.

As described above, according to the present embodiment, each item is encrypted with a different encryption key, so it is possible to set whether or not each item can be disclosed to a third party. The driver may also agree to disclose only some of the items included in the vehicle data. For example, the user may agree to disclose the location of the vehicle 10, but may not agree to disclose the driver's name or address.

Other Embodiments

The above-described embodiment is merely an example, and the present disclosure may be appropriately modified and implemented without departing from the scope thereof. The processes and means described in the present disclosure can be freely combined and implemented as long as no technical contradiction occurs. Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. Non-transitory computer-readable storage media include, for example, any type of disks such as magnetic disks (floppy (registered trademark) disks, hard disk drives (HDDs), etc.), optical disks (Compact Discs (CDs)-Read Only Memory (ROMs), Digital Versatile Discs (DVD), Blu-ray Disc, etc.), Read Only Memory (ROM), Random Access Memory (RAM), Erasable Programmable Read-Only Memory (EPROM), Electrically Erasable Programmable Read-Only Memory (EEPROM), magnetic cards, flash memory, optical cards, and any type of medium suitable for storing electronic instructions.

What is claimed is:

1. A vehicle advertisement system, comprising:

a data analysis server including a first processor;

a data utilization server including a second processor;

a vehicle that transmits first data regarding traveling to the data analysis server; and a user terminal of a driver of the vehicle, wherein the first processor is configured to generate second data that is encrypted, transmit the second data to the data utilization server, and transmit, to the data utilization server, at every predetermined period, a key for decrypting the second data transmitted to the data utilization server during the predetermined period, and the second processor is configured to identify, based on the second data, places where the driver goes, and provide the user terminal with an advertisement that matches the places.

2. The vehicle advertisement system according to claim 1, wherein the first processor is configured to check whether consent from the user terminal to disclose the first data is obtained, and transmit the key to decrypt the second data to the data utilization server only when the consent is obtained.

3. The vehicle advertisement system according to claim 1, wherein the predetermined period is a period during which the vehicle travels a predetermined distance, or a period of one trip of the vehicle.

4. The vehicle advertisement system according to claim 1, wherein the first data includes a plurality of items, the second data is encrypted using a different key for each of the plurality of items, and the first processor is configured to transmit the key corresponding to, out of the items, an item regarding which consent to disclose is obtained from the user terminal, to the data utilization server.

* * * * *